(12) United States Patent
Agrawal et al.

(10) Patent No.: US 9,191,827 B2
(45) Date of Patent: *Nov. 17, 2015

(54) MOBILITY DETECTION FOR EDGE APPLICATIONS IN WIRELESS COMMUNICATION NETWORKS

(71) Applicant: International Business Machines Corporation, Armonk, NY (US)

(72) Inventors: Dakshi Agrawal, Monsey, NY (US); Bongjun Ko, Harrington Park, NJ (US); Franck Le, White Plains, NY (US); Robert B. Nicholson, Southsea (GB); Vasileios Pappas, Elmsford, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/768,386

(22) Filed: Feb. 15, 2013

(65) Prior Publication Data

US 2014/0064141 A1    Mar. 6, 2014

Related U.S. Application Data

(63) Continuation of application No. 13/601,251, filed on Aug. 31, 2012.

(51) Int. Cl.
*H04W 4/02*   (2009.01)
*H04W 24/00*   (2009.01)
(Continued)

(52) U.S. Cl.
CPC .............. *H04W 24/00* (2013.01); *H04W 64/00* (2013.01); *H04W 80/00* (2013.01)

(58) Field of Classification Search
CPC ....... H04L 49/557; H04L 45/28; H04L 12/56; H04L 12/66; H04J 3/14; H04W 80/04; H04W 4/06; H04W 24/00; H04W 8/08; H04W 40/24; H04W 64/00; H04W 60/00; H04W 36/22; H04W 48/20; H04W 8/02; H04W 92/02
USPC ......... 370/216–217, 220, 225–228, 242, 248, 370/328, 312, 389, 401, 338, 331, 310, 352, 370/252, 329, 349, 351, 465, 254, 335, 469, 370/241, 313, 332, 342, 350, 392, 395.2, 370/395.21, 395.5, 466, 468, 474, 521, 370/910; 455/436, 445, 435.1, 443, 417, 455/422.1, 432.1, 433, 437, 440, 442, 450, 455/456.1, 560, 403, 404.1, 404.2, 410, 455/412.1, 414.1, 414.2, 416, 421, 426.1, 455/428, 439, 444, 449, 452.2, 456.2, 455/456.3, 456.5, 457, 458, 466, 521, 455/552.1, 561; 709/227, 238, 239, 242
See application file for complete search history.

(56) References Cited

U.S. PATENT DOCUMENTS 8,073,972 B2    12/2011   Jansen et al.
8,086,690 B1    12/2011   Heymans et al.
(Continued)

OTHER PUBLICATIONS

Non Final Office Action dated Mar. 26, 2014 received for U.S. Appl. No. 13/601,251.

(Continued)

*Primary Examiner* — Charles C Jiang
*Assistant Examiner* — Rose Clark
(74) *Attorney, Agent, or Firm* — Fleit Gibbons Gutman Bongini & Bianco PL; Thomas Grzesik

(57) ABSTRACT

Various embodiments detect wireless communication device mobility in a wireless communication network. In one embodiment, one or more Internet Protocol (IP) data packets associated with a wireless communication device are analyzed. The wireless communication device is coupled with the edge entity. A determination is made, based on the analyzing, that the wireless communication device is a newly coupled device at the edge entity. A central entity disposed within the wireless communication network is notified that the wireless communication device is currently coupled to the edge entity.

8 Claims, 12 Drawing Sheets

(51) Int. Cl.
*H04W 64/00* (2009.01)
*H04W 80/00* (2009.01)

(56) References Cited

U.S. PATENT DOCUMENTS

| | | | |
|---|---|---|---|
| 8,699,462 B2 | 4/2014 | Spinelli et al. | |
| 2002/0057657 A1 | 5/2002 | La Porta et al. | |
| 2006/0064478 A1 | 3/2006 | Sirkin | |
| 2008/0117884 A1* | 5/2008 | Ishii et al. | 370/338 |
| 2008/0268848 A1 | 10/2008 | Tomoe et al. | |
| 2009/0238115 A1 | 9/2009 | Yamane | |
| 2010/0128677 A1* | 5/2010 | Liu et al. | 370/328 |
| 2010/0272013 A1* | 10/2010 | Horn et al. | 370/328 |
| 2010/0278141 A1* | 11/2010 | Choi-Grogan et al. | 370/331 |
| 2011/0103310 A1* | 5/2011 | Stojanovski et al. | 370/328 |
| 2011/0176531 A1* | 7/2011 | Rune et al. | 370/338 |
| 2011/0235546 A1* | 9/2011 | Horn et al. | 370/254 |
| 2011/0238822 A1 | 9/2011 | Weniger et al. | |
| 2011/0294506 A1* | 12/2011 | Claussen et al. | 455/435.1 |
| 2012/0014316 A1* | 1/2012 | Rahman | 370/328 |
| 2012/0151030 A1 | 6/2012 | Guttman et al. | |
| 2012/0201186 A1* | 8/2012 | Awano | 370/312 |
| 2012/0264443 A1 | 10/2012 | Ng et al. | |
| 2012/0281707 A1* | 11/2012 | Muhanna et al. | 370/401 |
| 2012/0294264 A1* | 11/2012 | Valluri et al. | 370/329 |
| 2012/0322452 A1* | 12/2012 | Samuel et al. | 455/437 |
| 2013/0010756 A1* | 1/2013 | Liang et al. | 370/331 |
| 2013/0028237 A1* | 1/2013 | Cheng et al. | 370/331 |
| 2013/0308527 A1* | 11/2013 | Chin et al. | 370/328 |
| 2014/0119340 A1 | 5/2014 | Stojanovski et al. | |

OTHER PUBLICATIONS

International Search Report and Written Opinion dated Nov. 7, 2013 for International Application No. PCT/US/13/57475.
Final Office Action dated Aug. 15, 2014 recieved for U.S. Appl. No. 13/601,251.
Non-Final Office Action dated Dec. 3, 2014 received for U.S. Appl. No. 13/601,251.
Final Office Action dated Mar. 18, 2015, received for U.S. Appl. No. 13/601,251.

* cited by examiner

MOBILITY DETECTION FOR EDGE APPLICATIONS IN WIRELESS COMMUNICATION NETWORKS

CROSS-REFERENCE TO RELATED APPLICATIONS

This application is a continuation of and claims priority from prior U.S. patent application Ser. No. 13/601,251, filed on Aug. 31, 2012, the entire disclosure of which is herein incorporated by reference.

BACKGROUND

The present invention generally relates to wireless communication networks, and more particularly relates to user equipment mobility detection in wireless communication networks.

Demand for wireless services is increasing rapidly as evident by the tremendous growth in recent years in smart mobile phones. This explosive growth in data traffic and its bandwidth requirements have already saturated the current generation of cellular networks and will continue to pose a major bandwidth challenge for next generation of cellular networks (e.g., Long Term Evolution (LTE) based networks). Thus, while LTE networks will have greater capacity than current networks, they will carry significantly larger data traffic over both the radio and the backhaul links.

BRIEF SUMMARY

In one embodiment, an edge entity disposed at an edge of a wireless communication network for detecting mobility of wireless communication devices is disclosed. The edge entity comprises a memory and a processor that is communicatively coupled to the memory. A local device location manager is communicatively coupled to the memory and the processor. The local device location manager is configured to perform a method. The method comprises analyzing one or more Internet Protocol (IP) data packets associated with a wireless communication device, wherein the wireless communication device is coupled with the edge entity. A determination is made, based on the analyzing, that the wireless communication device is a newly coupled device at the edge entity. A central disposed within the wireless communication network is notified, based on the determination, that the wireless communication device is currently coupled to the edge entity.

In another embodiment, a computer program storage product for detecting mobility of wireless communication devices by an edge entity disposed at an edge of a wireless communication network is disclosed. The computer program storage product comprises instructions configured to perform a method. The method comprises analyzing one or more Internet Protocol (IP) data packets associated with a wireless communication device, wherein the wireless communication device is coupled with the edge entity. A determination is made, based on the analyzing, that the wireless communication device is a newly coupled device at the edge entity. A central disposed within the wireless communication network is notified, based on the determination, that the wireless communication device is currently coupled to the edge entity.

In yet embodiment, a computer program storage product for detecting mobility of wireless communication devices by an edge entity disposed at an edge of a wireless communication network is disclosed. The computer program storage product comprises instructions configured to perform a method. The method comprises monitoring for Internet Protocol (IP) data packets associated with a given wireless communication device. A determination is made that one or more IP data packets associated with the given wireless communication device have failed to be received within a given threshold. A set of wireless communication device location information associated with the given wireless communication device is updated, based on the determination, to indicate that the given wireless communication device has been decoupled from the edge entity.

In another embodiment, a computer program storage product for detecting mobility of wireless communication devices with a central entity disposed within a wireless communication network is disclosed. The computer program storage product comprises instructions configured to perform a method. The method comprises intercepting one or more Internet Protocol (IP) data packets associated with a wireless communication device, wherein the wireless communication device is coupled to an edge entity. A determination is made that the one or more IP data packets have been changed by the edge entity. At least one identifier associated with the edge entity is identified within the one or more IP data packets based on the determination. A set of wireless communication device location information is updated based on the at least one identifier to indicate that the wireless communication device is currently coupled to the edge entity.

In further embodiment, a computer program storage product for detecting mobility of wireless communication devices with a central entity disposed within a wireless communication network is disclosed. The computer program storage product comprises instructions configured to perform a method. The method comprises intercepting one or more Internet Protocol (IP) data packets associated with a wireless communication device. At least one parameter of the one or more IP data packets is changed. A last known edge entity associated with the wireless communication device is identified based on a set of wireless communication device location information. The one or more IP data packets that have been changed are sent to the last known edge entity for reception by the wireless communication device.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Data traffic management is becoming more important for network operators as they try to curb the amount of data traffic that traverses the backhaul and core networks in the cellular network infrastructure. One option for reducing data traffic at the backhaul and core networks is to deploy applications and serve the wireless mobile users' data/service requests at the edge of the wireless networks (e.g., at the base station). Most of the application and appliances built on top of TCP/IP protocol stacks assume that the locations of the users are fixed or slowly changing. However, this assumption does not hold true when these applications are deployed at the edge of the wireless networks. The significance of this mismatch in the assumption on the user location (or mobility) is that, often, the edge applications cannot adequately serve the mobile users when the users' locations change during the application session.

A challenging problem in handling the user mobility for the edge applications is to detect the current location of the mobile users, i.e., which edge node a particular user is currently connected to using information available in the TCP/IP layer. The existence of multiple layers between the TCP/IP protocols and the cellular network protocols that handle the mobility makes it difficult to expose the users' current location information to the TCP/IP applications in a generic manner.

Therefore, one or more embodiments utilize the information available at the TCP/IP protocol suites to detect the current location of mobile users in a wireless communication network. In one embodiment, this is accomplished by using a combination of devices located at the edge and at the core. For example, one or more edge entities (EEs) are implemented at the edge of the wireless communication networks and a central entity (CE) is implemented at the gateway location in the network. The CE and EEs work in coordination to detect where a particular user is currently located within the network.

Operating Environment

Figure 1:
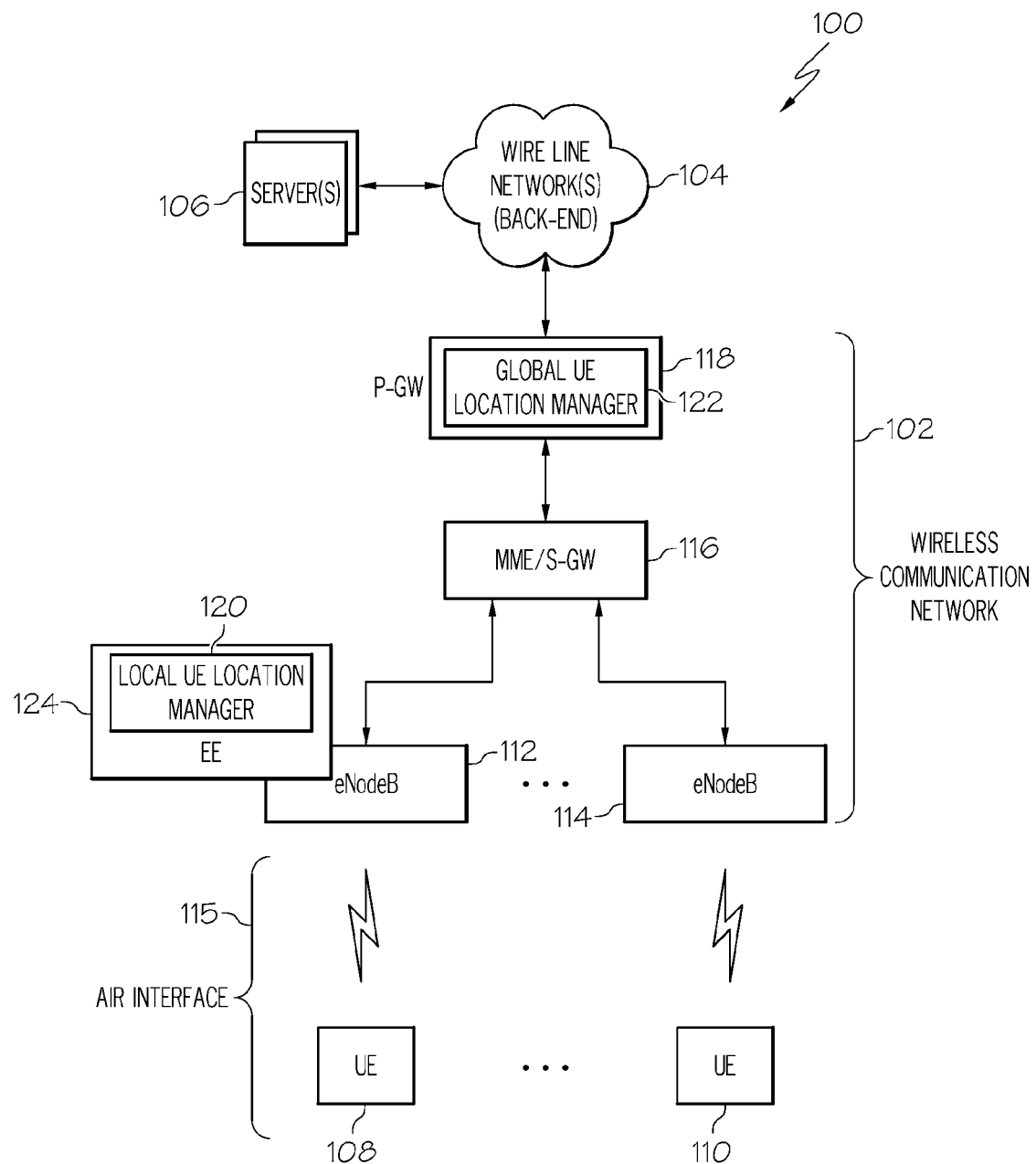
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples, for example, one or more content sources/providers, such as a server(s) 106, to the wireless communication network 102. In further embodiments, the back-end is not a wire line network. For example, in one embodiment the back-end is a wireless network and takes the form of a point-to-point back-end network such as a directional microwave network used to transmit and receive signals bi-directionally. Alternatively, the back-end takes the form of a network of peers in which a mobile base station (e.g., eNodeB in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, an Evolution Data Only (EV-DO) network, a GPRS network, a Universal Mobile Telecommunications System (UMTS) network, and the like. In the example of FIG. 1, the wireless communication network 102 is an LTE network.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or transceiver nodes 112, 114 situated at the edge of the wireless communication network 102. For example, the UE devices 108, 110 access the wireless communication network 102 through one or more transceiver nodes 112, 114 using one or more air interfaces 115 established between the UE devices 108, 110 and the transceiver nodes 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNodeB) depending on the technology being implemented within the wireless communication network 104. This exemplary embodiment relates to an LTE network, so the illustrated transceiver nodes 112, 114 are eNodeBs. The transceiver nodes 112, 114 are communicatively coupled to one or more antennas communicates directly with the core of the wireless communication network 102. It should be noted that in another embodiment, a radio network controller (RNC) or base station controller (BSC) is communicatively coupled to a transceiver node 112, 114 for managing and controlling one or more base stations.

In the example shown in FIG. 1 one or more mobility management entities and serving gateway nodes (MME/S-GW) 116 are communicatively coupled to the plurality of eNodeBs 112, 114. A packet gateway node (P-GW) 118 is communicatively coupled to the MME/S-GW 116 and to the wire line network 104 (e.g., Core IP Network). It should be noted that even though FIG. 1 shows the MME combined with the S-GW, the MME can be separate and distinct from the S-GW. It should be noted that the MME/S-GW is also referred to herein as the "MME 116". The MME/S-GW 116 manages mobility (e.g., a transfer) of the UE devices across different eNodeBs and also acts as a serving gateway for data. The P-GW 118 acts as the gateway to the wire line network 104.

In one example, the communication protocols between the UE devices 108, 110 and the P-GW 118 are various 3rd Generation Partnership Project (3GPP) protocols over which the internet protocol (IP) traffic from the UE devices 108, 110 is tunneled. For example, a GPRS tunneling protocol (GTP) is utilized between the eNodeBs 112, 114 and the MME/S-GW 116 as well as between the MME/S-GW 116 and the P-GW 118. A standard Internet Protocol (IP) is utilized between the P-GW 118 and the wire line network 104. The server(s) 106 has a TCP (Transmission Control Protocol) socket that communicates with a TCP socket at the UE devices 108, 110 when a user wishes to access data from the server 106. An IP tunnel is created from the P-GW 118 to UE devices 108, 110 for user traffic and passes through the interim components, such as the MME/S-GW 116.

FIG. 1 further shows that at least one of the eNodeBs 112, 114 and the P-GW 118 are each communicatively coupled to a UE location manager 120, 122. For example, at least one of the eNodeBs 112, 114 is coupled to a local UE location manager 120 and the P-GW 116 is coupled to a global UE location manager 122. In one embodiment, the local UE location manager(s) 120 resides within an information processing system referred to herein as an "edge entity (EE) 124" that is communicatively coupled to one or more eNodeBs 112. In one embodiment, the EE 124 is the same as (or is part of) the eNodeB 112. In this embodiment, the local UE location manager 124 resides within the eNodeB 112. In another embodiment, the EE 124 is separate and distinct from the eNodeB 112. The global UE location manager 122, in one embodiment, resides within the P-GW 118 (or alternatively the MME or the S-GW). In another embodiment, the global UE location manager 122 resides within a separate information processing system that is communicatively coupled to the P-GW 118. The system in which the global UE location manager 122 resides is herein referred to as a "central entity (CE)". One example of an EE 124 is a byte caching system as discussed in the commonly owned U.S. patent application Ser. No. 13/601,306 entitled "Byte Caching In Wireless Communication Networks" filed on Aug. 31, 2012, the entire disclosure of which is hereby incorporated by reference in its entirety.

As will be discussed in greater detail below, the UE location managers 120, 122 detect the current location/mobility of UE devices 108, 110 in the wireless communication network 102 using the information available at the TCP/IP protocol suites. Location/mobility refers to the current EE 124 (and/or eNodeB 112, 114) coupled to a given UE device 108. As will be discussed in greater detail below, the local and global location managers 120, 122 (and hence the CE 118 and the EEs 124) separately maintain UE location information comprising the current location of the UE devices 108, 110. The EEs 124 and CE 118 share this location information through certain message exchanges. In one embodiment, an EE 124 detects the arrival of a UE device 108 at its location by observing the arrival of a new IP flow. The UE device 108 "arrives" at an EE 124 when the UE device 108 is coupled to an eNodeB 112 associated with the EE 124. The CE 118 detects the coupling of a UE device 108 to an EE 124 either by receiving an explicit notification from that EE 124 or by observing one or more uplink packets that is mangled (changed) by that EE 124.

An EE 124 detects the departure of a user from its location by receiving a notification from the CE 118 indicating the arrival of the same user at the location of some other EE. The EE 124 departs from an EE 124 when it decouples from the eNodeB 112 associated with the EE 124. In another embodiment, an EE 124 detects the departure of a UE device 108 from its location by observing the lack of IP packets from/to the same UE devices 108 at its location. The CE 118 detects the departure of a UE device 108 from the location of an EE 124 either by (1) receiving an explicit notification from the EE 124, which detected the departure implicitly; (2) receiving an explicit notification from some other EE that detected the arrival of the same UE device 108; or (3) observing certain patterns of the responses from the UE device 108 in response to the packet mangled by the CE 118.

Figure 2:
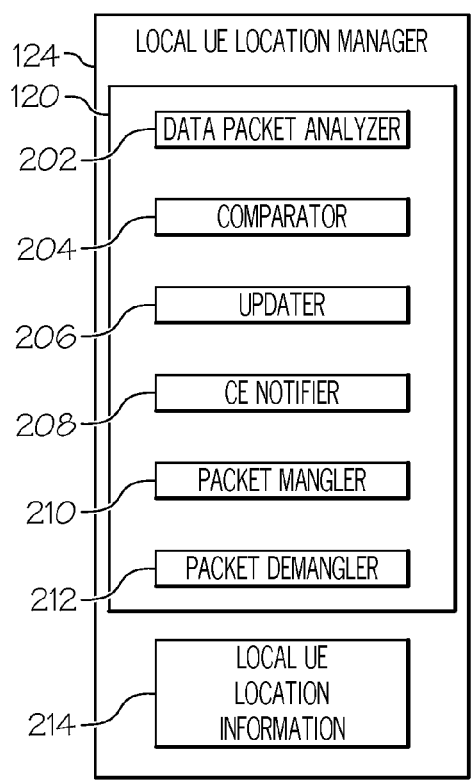
FIG. 2 is a block diagram illustrating a detailed view of a local UE (user equipment) device location manager according to one embodiment of the present invention.
Figure 3:
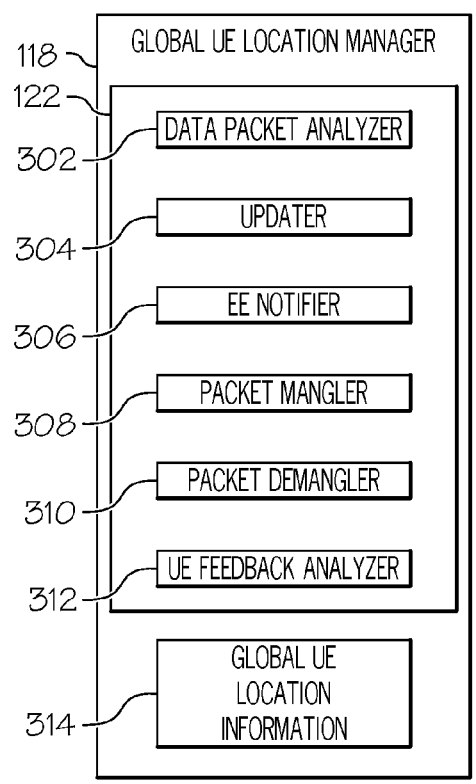
FIG. 3 is a block diagram illustrating a detailed view of a global UE device location manager according to one embodiment of the present invention.

FIGS. 2 and 3 show a more detailed example of the local UE location manager 120 and the global UE location manager 122, respectively. In particular, FIG. 2 shows that the local UE location manager 120 of an EE 124 comprises a data packet analyzer 202, a comparator 204, an updater 206, a CE notifier 208, a packet mangler 210, and a packet demangler 212. FIG. 2 further shows that local UE location (mobility) information 214 is also included within the EE 124 and/or the local UE location manager 120. The local UE location information 214 (also referred to herein as "local information 214") is used by the local UE location manager 120 to record and maintain information associated with UE devices 108, 110 that are currently coupled to the EE 124 (and/or eNode B 112) associated with the local UE location manager 120. The local UE location manager 120 and its components are discussed in greater detail below.

FIG. 3 shows that the global UE location manager 122 of the CE 118 comprises a data packet analyzer 302, an updater 304, an EE notifier 306, a packet mangler 308, and a packet demangler 310, and a UE feedback analyzer 312. FIG. 3 further shows that global UE location (mobility) information 314 is also included within the CE 118 and/or the global UE location manager 122. The global UE location information 314 (also referred to herein as "global information 314") is used by the global UE location manager 122 to record and maintain UE location information for each EE 124 (and/or eNodeBs 112, 114) that is coupled to the CE 118. The global UE location manager 122 and its components are discussed in greater detail below.

Mobility Detection

Figure 4:
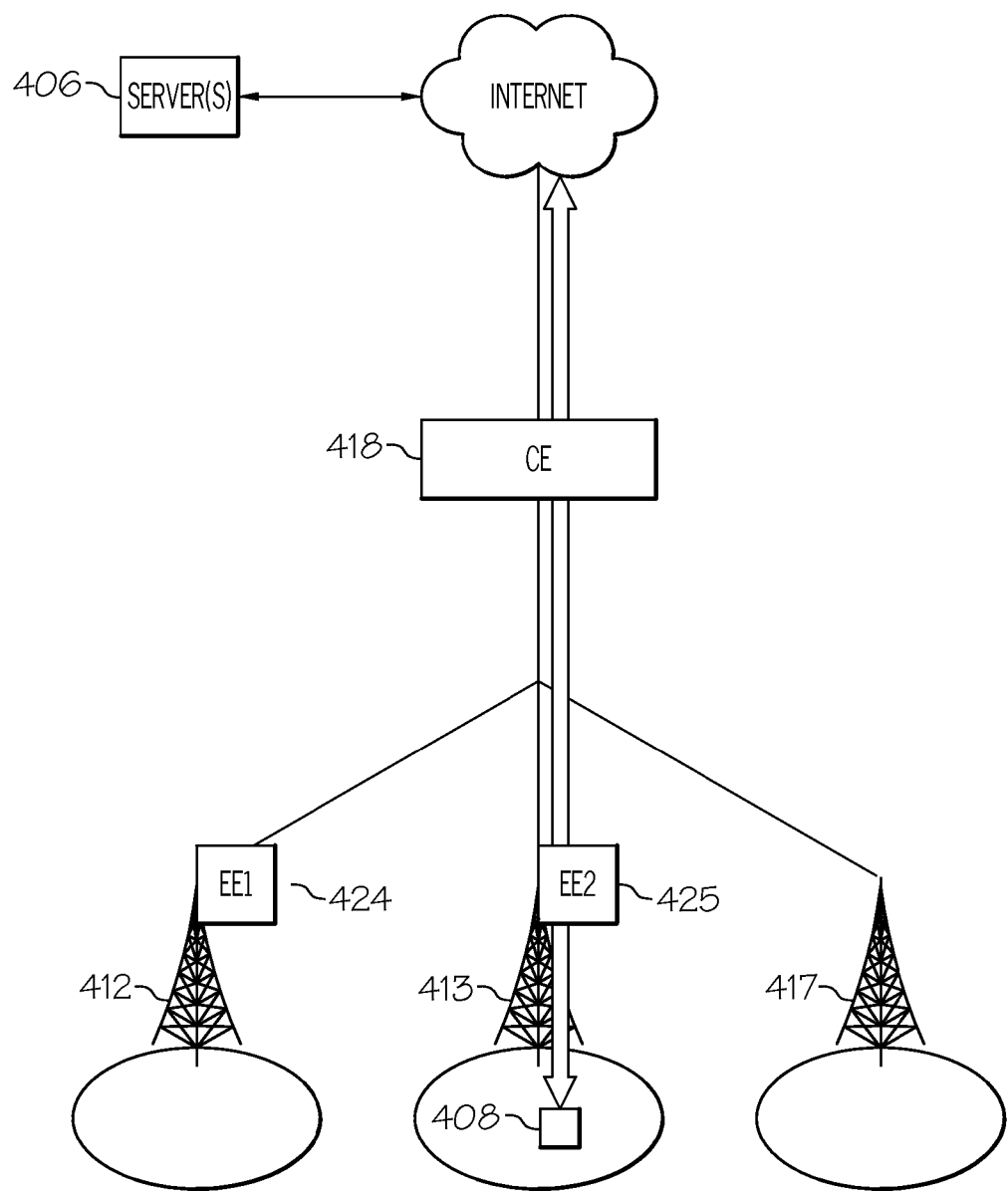
FIG. 4 shows one example of an environment for detecting UE device mobility in a wireless communication network according to one embodiment of the present invention.

The following is a more detailed discussion on detecting the current location/mobility of UE devices 108, 110 in the wireless communication network 102 using the information available at the TCP/IP protocol suites. FIG. 4 shows one embodiment, where a UE device 408 is coupled to an EE 425 by establishing a connection with an eNodeB 413 associated with the EE 425. A UE device 408 can be coupled to an EE 424 when the device enters the network 102 and connects to an eNodeB 412; moves from one eNodeB 412 associated with an EE 424 to another eNodeB 413 associated with another EE 425; etc.

In the example of FIG. 4 the UE device 408 attaches to the wireless communications network in a conventional manner, and can then connect to any server (e.g., 406) from the Internet. For example, the UE device 108 makes a TCP connection to a port (e.g., port 80) at a server 406 it wishes to receive data from. The packet analyzer 202 at the EE 425 analyzes the IP data packets flowing through the IP tunnel. Based on this analysis the packet analyzer 202 identifies the UE device 408 associated with the data packets. For example, the packet analyzer 202 identifies the source and/or destination addresses in each data packet received from the UE device 408 and/or server 406. If the data packet was received from the UE side, the packet analyzer 202 extracts the source address from the packet. If the data packet was received from the server side, the packet analyzer 202 extracts the destination address of data packet. Alternatively, the packet analyzer 202 can analyze the signaling traffic between the eNodeB 412 and the MME/S-GW 116 and/or CE (e.g., P-GW) 418. The packet analyzer 202, based on this analysis, identifies UE mobility events, such as (but not limited to) a new binding association between a UE and an eNodeB or a disassociation between a UE and eNodeB. For example the packet analyzer 202 can analyze the proxy mobile IP signaling traffic generated by an eNodeB and identify the address of the UE that has been associated or disassociated from the eNodeB.

Figure 5:
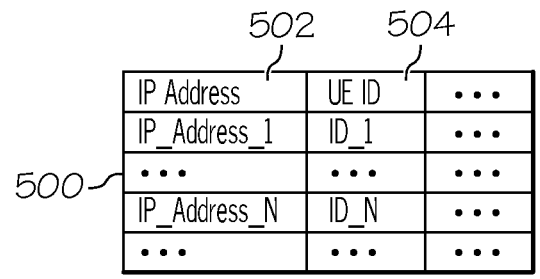
FIG. 5 shows one example of local UE location information according to one embodiment of the present invention.

Once the address associated with the UE device 408 has been identified and extracted the comparator 204 compares the address/ID to the local information 214. FIG. 5 shows one example of this information being maintained in a table 500 of a database. However, other mechanisms for storing and organizing the local information 214 are applicable as well. In particular, the local information 214 comprises the IP address 502 associated with each UE device 408 currently coupled to the EE 425. The local information 214 can also comprise a unique ID 504 such as (but not limited to) the electronic serial number (ESN) of the UE device 408. It should be noted that the local information 214 can also include other information as well and is not limited to the examples shown in FIG. 5.

Figure 6:
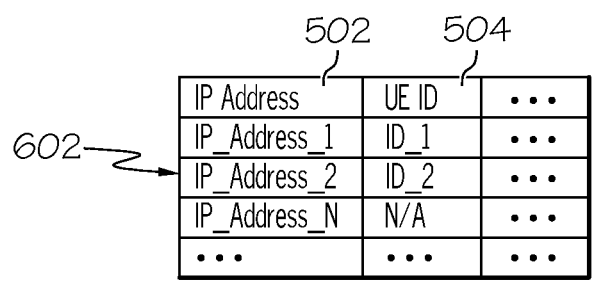
FIG. 6 shows one example of updating the local UE location information of FIG. 5 according to one embodiment of the present invention.

The comparator 204 compares the source/destination address (and/or unique ID) extracted from the received IP data packet(s) to the local information 214 to determine if the UE device 408 is a newly coupled device at the EE 425. For example, in the current example the UE device 408 has an IP address of IP_ADDRESS_2. Therefore, the comparator 204 analyzes the local information 214 to determine if an entry/record exists for a UE device with IP_ADDRESS_2. In this example, an entry comprising IP_ADDRESS_2 does not exist in the local information 214, as shown in FIG. 5. Therefore, the comparator 204 determines that the UE device 408 is a newly coupled device. The updater 206 adds an entry 602 to the location information 214 comprising the IP address (e.g., IP_ADDRESS_2) of the device 408, as shown in FIG. 6. Also, if a unique identifier of the UE device 408 has also been extracted from the data packet(s) this identifier is also added to the location information. Alternatively, the local UE location manager 120 can assign a unique ID to the UE device 408 as well.

The CE notifier 208 notifies the CE 418 that this particular UE device 408 is currently located at (coupled to) the EE 425 (and/or eNodeB 413). For example, the CE notifier 208 sends a message to the CE 418 comprising a unique identifier of the EE 425 (and/or eNodeB 414) as well as the IP address and/or unique ID of the UE device 408. It should be noted that the EE 425 and CE 418 can use any TCP/IP based protocol to exchange messages. For example, the protocol messages can be encoded in a binary format by using remote procedure calls, or a human readable format by using web services. The updater 304 at the CE 418 updates the global information 314 based on this UE location information received from the EE 424.

Figure 7:
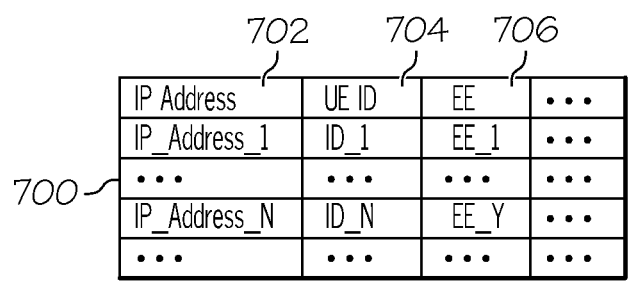
FIG. 7 shows one example of global UE location information according to one embodiment of the present invention.

In one embodiment, the global information 314 comprises the location information of each UE device 408 coupled to an EE 424, 425 (and/or eNodeB 412, 414) associated with the CE 418. For example, FIG. 7 shows one example of the global information 314. In the example of FIG. 7, the global information 314 is maintained in a table 700 of a database. However, other mechanisms for storing and organizing the global information 314 are applicable as well. FIG. 7 shows that each entry (row) comprises the IP address 702 of a UE device, the unique ID (if available) 704 of the UE device, and the EE identifier 706 of the EE 424 where the UE device currently located. It should be noted that additional information can be included in the global information 314 as well. Also, a separate table can be maintained for each EE 424 as compared to a single table as shown in FIG. 7. In this embodiment, the EE identifier 706 is used to identify the particular table/record in which to store the IP address and unique ID of the UE device 408. The EE identifier 706 is not required to be stored in each row of this table since the entire table is associated with the given EE.

Figure 8:
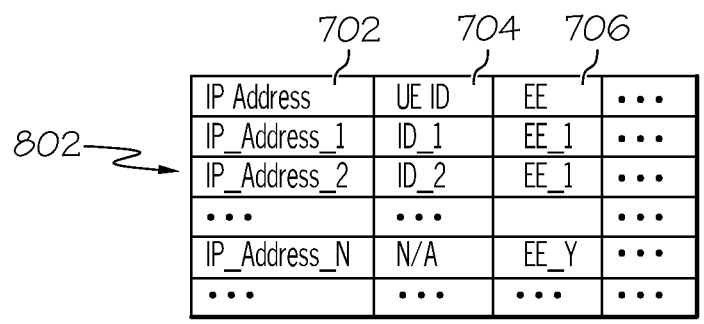
FIG. 8 shows one example of updating the global UE location information of FIG. 7 according to one embodiment of the present invention.
Figure 9:
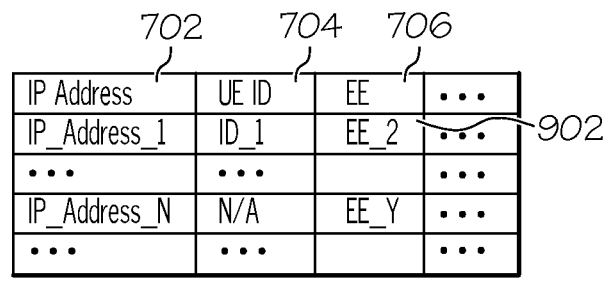
FIG. 9 shows another example of updating the global UE location information of FIG. 7 according to one embodiment of the present invention.

When the CE 418 receives UE location information from an EE 424, the updater 304 at the CE 418 updates the global information 314 based thereon. For example, the updater 304 analyzes the received location information and identifies either the unique identifier and/or the IP address of the UE device 408. The updater 304 then compares the received unique identifier and/or the IP address to the global information 314 to determine if an entry currently exists for the UE device 408. If an entry does not exist this indicates, for example, that the UE device 408 has just entered the wireless communication network 102 or has moved from an eNodeB without an EE. The updater 304 creates an entry 802 in the global information 314 for the UE device 408 (and/or EE 424) as shown in FIG. 8. If an entry does exist, this indicates that the UE device 408 has moved from one eNodeB 412 with an EE 424 to another eNodeB 413 with an EE 425. The updater 304 updates the EE information 902 in global information 314 for the UE device 408, as shown in FIG. 9. For example, FIG. 7 shows that the UE device with the IP address of IP_Address_1 device was previously coupled to EE_1, but the UE location information received from an EE 425 indicates that the UE device is now coupled to the EE 425. Therefore, the updater 304 updates the global information 314 for the UE device to reflect that it is now located at (coupled to) EE 425 by associating its identifier, EE_2, with the UE device.

It should be noted that in an embodiment where separate tables are maintained for each EE 424, 425, the updater 304 can search through the tables to identify an entry comprising the unique identifier and/or the IP address of the given UE device. Once this entry is identified the updater 304 can remove this entry from the identified table since the UE is no longer located at the previous EE 424, or the updater 304 can mark this entry as invalid. The updater 304 can then add an entry to the table associated with the new EE 425 identified in the UE information received from the EE 425 to indicate that the UE device 408 is currently coupled to the EE 425.

Once the global UE location manager 122 at the CE 418 identifies the EE 424 where the UE device 408 was previously coupled to, the EE notifier 306 the notifies this EE 424 that the UE device 408 has been decoupled therefrom. It should be noted that the CE 418 and EE 425 can use any TCP/IP based protocol to exchange messages. For example, the protocol messages can be encoded in a binary format by using remote procedure calls, or a human readable format by using web services. The local UE location manager 120 at this EE 424 receives this notification and updates its local information 214 accordingly. For example, the local UE location manager 120 removes the entry associated with the UE device from its local information 214. Alternatively, the local UE location manager 120 keeps the entry but updates the entry to reflect that the UE device is no longer located at the EE 424.

In another embodiment, the local UE location manager 120 at an EE 424 can detect when a UE device 408 is no longer located at (coupled to) the EE 424 without receiving a notification from the CE 418. For example, the local UE location manager 120 determines if any IP data packets associated with a UE device 408 identified within its local information 214 have been received within a given time threshold. The local UE location manager 120 can store a time stamp within the local information 214 associated with the last IP data packet received for the given UE device 408. If a new IP data packet is not received within a given amount of time (threshold) from the stored time stamp the local UE location manager 120 determines that the UE device 408 has moved to a new EE 425; has left the network; or has moved to an eNodeB 417 that is not associated with an EE. The local UE location manager 120 updates its local information 214 to indicate that the UE device 408 is no longer located at the EE 424 and notifies the CE 418. Upon receiving the notification from the EE 424 that the UE device 408 is no longer located at the EE 424, the CE 418 updates its global UE location information 314 to indicate that the UE device 408 is no longer located at the EE 424.

Figure 10:
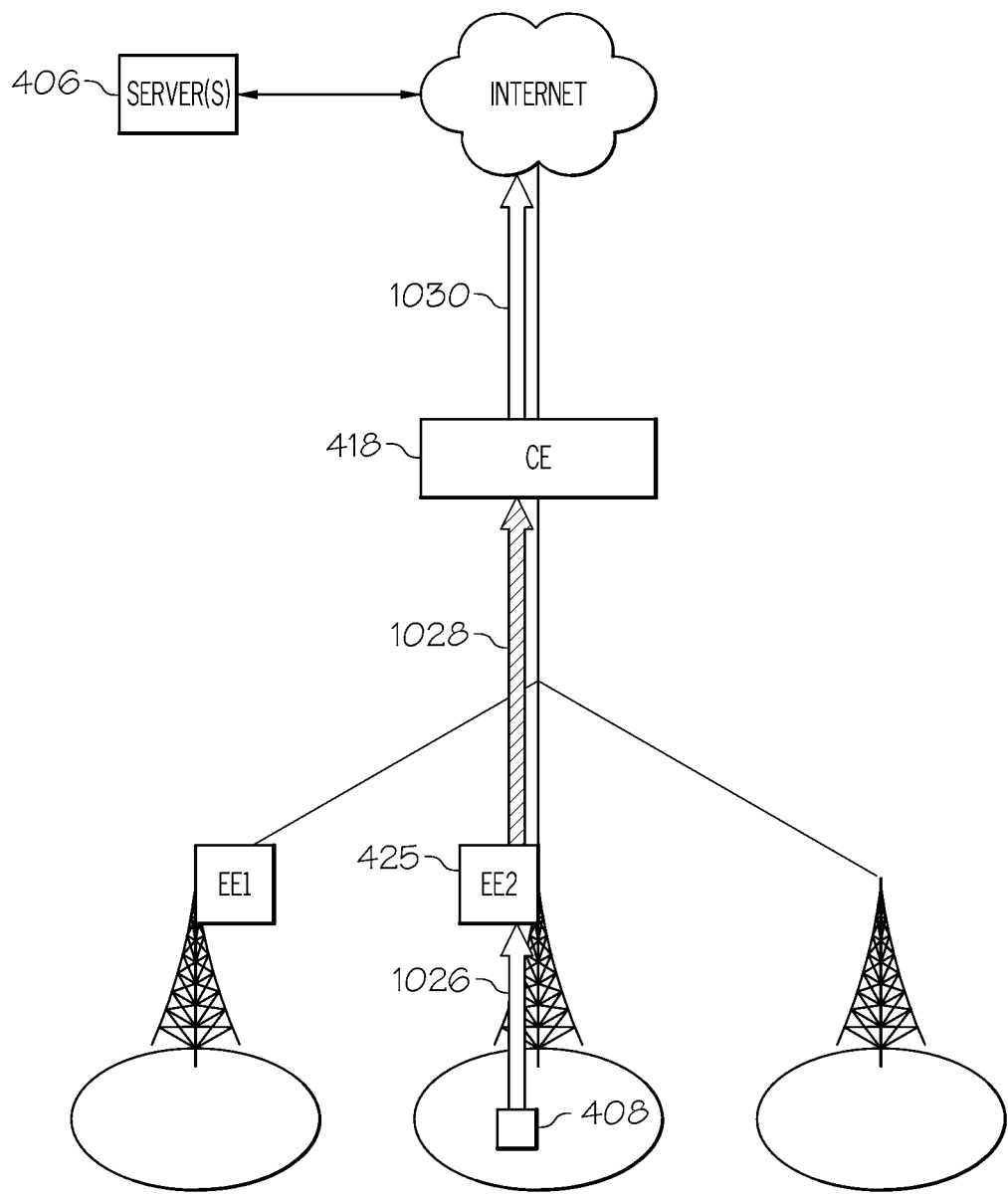
FIG. 10 shows another example of an environment for detecting UE device mobility in a wireless communication network according to one embodiment of the present invention.
Figure 11:
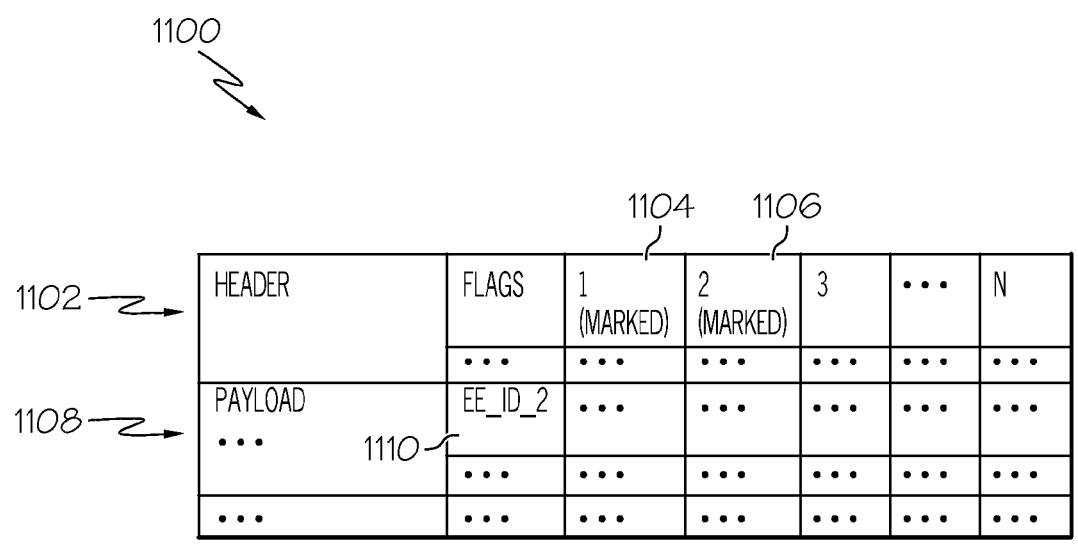
FIG. 11 shows one example of an IP (Internet Protocol) data packet that has been changed for detection of UE device mobility according to one embodiment of the present invention.

In another embodiment, the EEs 424, 425 and CE 418 detect UE mobility utilizing in-band signaling in the up-link direction as shown in FIG. 10. In this embodiment, after a UE device 408 is coupled to an eNodeB 413 associated with an EE 425 and establishes an IP link through the wireless communications network 102 the UE device 408 sends a packet 1026 to a destination such as a server 406. The local UE location manager 120 at the EE 425 intercepts this uplink packet 1026 and performs one or more mangling operations. For example, the packet mangler 210 of the location manager 120 mangles an uplink packet by marking unused flags in the IP packet header and also adds the ID of the EE 425 to the header. For example, FIG. 11 shows that the packet mangler 210 has marked one or more flags 1104, 1106 within the TCP header 1102 of the IP data packet 1100. However, any of the unused fields in the IP header and/or UDP header of the packet 1100 can also be marked by the mangler 210. FIG. 11 also shows that the packet mangler 210 has also added the ID 1110 of the EE to packet in the packet payload 1108 so that the CE 418 can determined under which EE the UE 408 has attached to. It should be noted that the local UE location manager 120 can also add proprietary TCP options to the IP data packet 1100 to carry the ID of the EE 425 and to also indicated that the packet 1100 comprises location information.

The EE 425 sends the mangled uplink packet 1028 to its destination and is intercepted by the CE 418. The packet analyzer 302 of the CE 418 analyzes the received packet 1028 and identifies the mangled fields therein. For example, the packet analyzer 302 determines that one or more of the flags are marked indicating that the packet comprises location information for the UE device 408 associated with the packet. The packet analyzer 302 identifies the UE device 408 associated with the uplink packet via the source address information within the packet (and/or an identifier associated with the UE device 408 within the packet) and updates the global information 314 similar to the embodiments discussed above. In addition, the packet demangler 310 of the global UE location manager 122 changes the received uplink packet to its original form. For example, the packet demangler 310 unmarks any of the marked flags in the packet header and also removes the EE ID from the packet as well. The CE 418 then sends the packet 1030 in its original form to its destination.

Packet mangling can also be used to determine when a UE device 408 has moved from an eNodeB 413 associated with an EE 425 to an eNodeB 417 that is not associated with an EE. For example, when the CE 418 intercepts/receives a downlink (e.g., server to UE device communication) IP packet the packet mangler 308 performs one or more mangling operations. These mangling operations include (but are not limited to) changing the port number within a TCP header of the packet to an unused port; change the port number within a UDP of the packet to an unused port; changing the protocol number in the IP header; changing the IP/TCP/UDP checksum value (e.g., by adding 1); etc.

The CE 418 then forwards the received packet to its indicated destination (i.e., UE device 408). If the eNodeB 412 servicing the destination UE device 408 is coupled to an EE 425 the local UE location manager 124 intercepts the packet and performs one or more demangling operations. For example, if the packet demangler 212 the EE 425 determines that the packet has been mangled by changing the port number to an unused port number the packet demangler 212 changes the port number back to the original port number. If the packet demangler 212 determines that the protocol number has been changed the packet demangler 212 changes the protocol back the original port number. If the packet demangler 212 determines that the checksum value has been changed the packet demangler 212 changes the checksum value back to the original value. The EE 425 then sends the received packet in its original form to the destination UE device 408.

However, if the UE device 408 is coupled to an eNodeB 417 that is not associated with an EE the UE device 408 receives the mangled data packet forwarded by the CE 418 and the TCP/IP stack of the UE device 408 sends a feedback back to the server 406 (e.g., an error response). The CE 418 sends the packet to the IP address associated with the UE device 408. The wireless communication network 102 forwards the packet to the location where the UE device 408 is attached to. With respect to the error message sent from the UE device 408 back to the server 406, wireless communication network 102 also guarantees that the packet traverses the P-GW 418. Therefore, the global UE location manager 122 can intercept the error message.

For example, the UE device 408 sends a TCP RESET message to the server 406 in response to the original port number having been changed in the TCP header. If the original port number in the UDP header was changed the UE device 408 sends an ICMP ERROR (destination port unreachable) message to the server 406. The UE device 408 also sends an ICMP ERROR (destination protocol unreachable) message to the server 406 in response to the original protocol being changed in the IP header. In any of the above cases the CE 418 intercepts the error message generated by the UE device 408, which is analyzed by the UE feedback analyzer 312. Based on this analysis the CE 418 can choose to forward the message to the server 406 or block the message. If the original checksum value has been changed the UE device 408 discards the packet, which results in a time-out occurring at the previous EE. The previous EE 425 can then notify the CE 418 that the UE device 408 is no longer located at its associated base station. Therefore, when the CE 418 receives one of the error messages above or the notification from the previous EE 425 the feedback analyzer 312 determines that the UE device 408 is coupled to a base station that is not associated with an EE. This information can be used, for example, by the CE 418 to determine if byte caching operations should be performed on received packets. For example, if the UE device 408 is coupled to a base station that is not associated with an EE the CE 418 determines that byte caching operations should not be performed.

As can be seen from the above discussion, the CE and EE work in coordination to detect where a particular user is currently attached. The CE maintains a global view of mobile devices and coordinates exchange of information between different EE as necessary. Detection of change in user mobility is can be performed in various ways. For example, a flow can be observed from a mobile device that is strategically altered by the attached EE positively affirming to the CE the attachment of the mobile device to a particular EE (and vice versa). In another example, the lack of flow from a previously attached device can be observed. This indicates that the device is inactive for any number of reasons.

Operational Flow Diagrams

Figure 12:
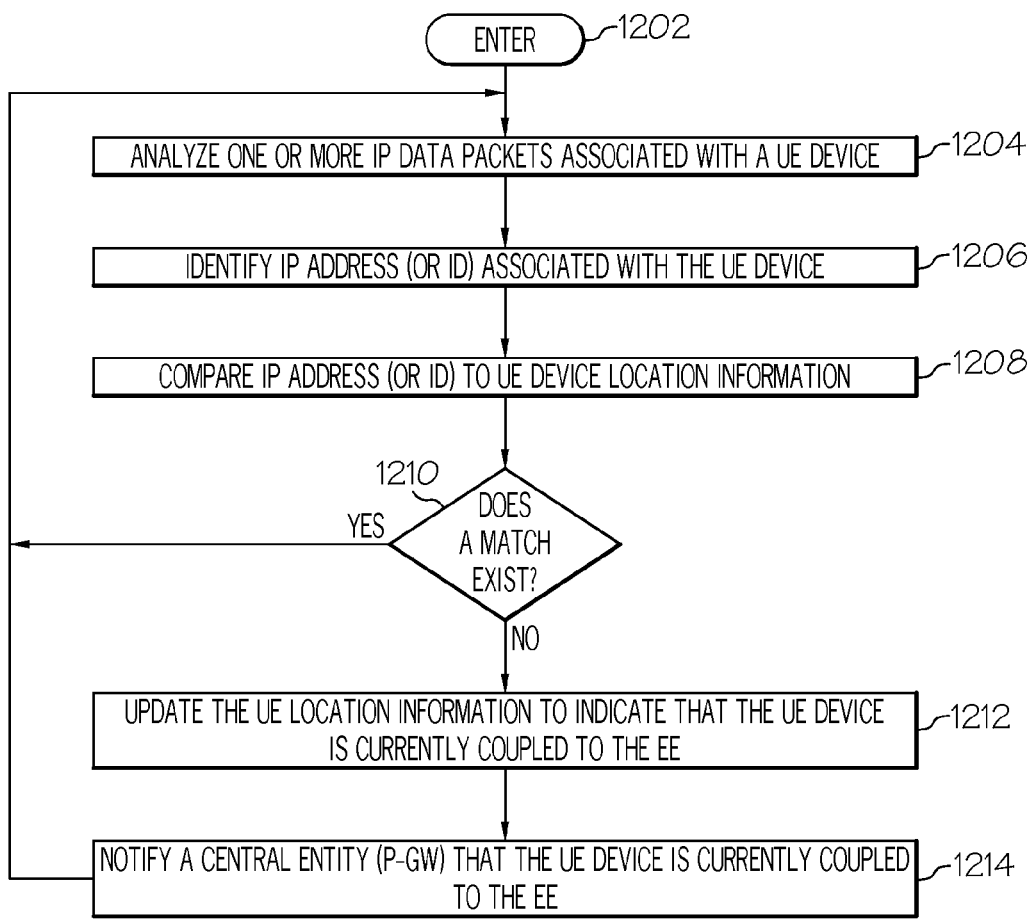
FIG. 12 is an operational flow diagram illustrating one example of detecting mobility of UE devices by an edge entity in a wireless communication network according to one embodiment of the present invention.

FIG. 12 is an operational flow diagram illustrating one example of detecting mobility of UE devices (wireless communication devices) by an edge entity (e.g., CE 118). The operational flow diagram of FIG. 12 begins at step 1202 and flows directly to step 1204. The local UE location manager 120 at an EE 124, at step 1204, analyzes one or more Internet Protocol (IP) data packets associated with a UE device (wireless communication device) 108, where the UE device 108 is coupled with the EE 124. The local UE location manager 120, at step 1206, identifies the IP address (or unique ID) associated with the UE device based on analyzing the one or more IP data packets.

The local UE location manager 120, at step 1208, compares the IP address (or ID) to the local UE location information 214 maintained by the EE 124. The local UE location manager 120, at step 1210, determines if any of the IP addresses (or IDs) within the local information 214 matches the IP address (or ID) obtained from the IP data packets. If the result of this determination is positive the UE device 108 has been coupled with the EE 124 for a given amount of time and the control flow returns to step 1204. If the result of this determination is negative, the local UE location manager 120 determines that the UE device 108 is a newly coupled device and the EE 124. The local UE location manager 120, at step 1212, updates the UE location information 214 to indicate that the UE device 108 is currently coupled to the EE 124. The local UE location manager 120, at step 1214, notifies the CE 118 that the UE device 108 is currently coupled to the EE 124. The control flow returns to step 1204.

Figure 13:
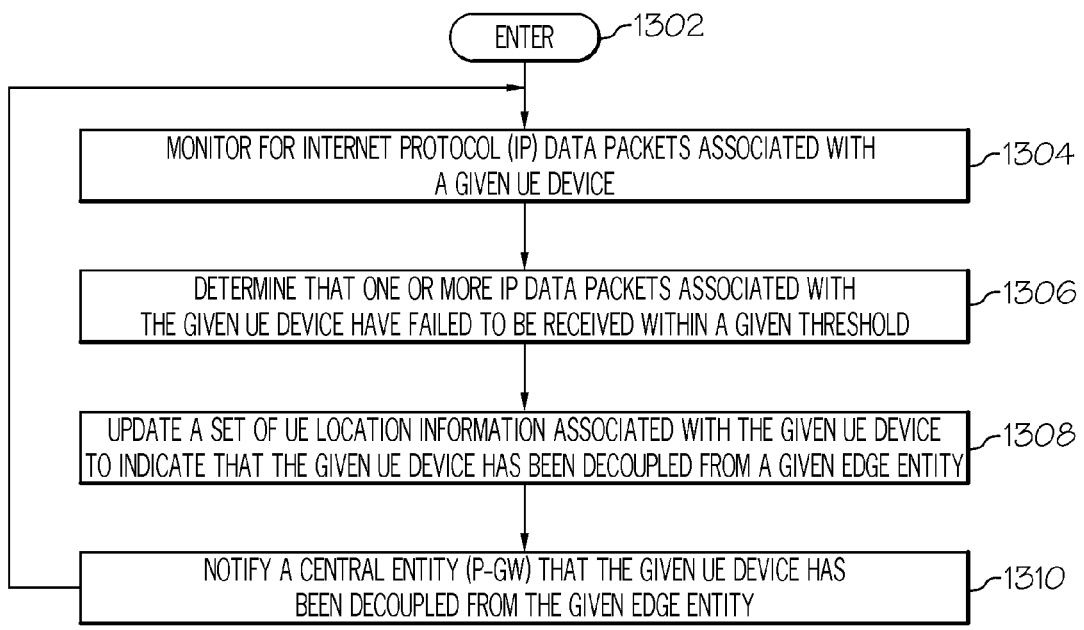
FIG. 13 is an operational flow diagram illustrating another example of detecting mobility of UE devices by an edge entity in a wireless communication network according to one embodiment of the present invention.

FIG. 13 is an operational flow diagram illustrating another example of detecting mobility of UE devices by an edge entity (e.g., EE 124). The operational flow diagram of FIG. 13 begins at step 1302 and flows directly to step 1304. The local UE location manager 120, at step 1304, monitors for Internet Protocol (IP) data packets associated with a given UE device 108. The local UE location manager 120, at step 1306, determines that one or more IP data packets associated with the given UE device 108 have failed to be received within a given threshold. The local UE location manager 120, at step 1308, updates a set of UE location information 214 associated with the given UE device 108 to indicate that the given UE device 108 has been decoupled from the EE 124 (e.g., the last known EE associated with the UE device 108). The local UE location manager 120, at step 1310, notifies the CE 118 that the given UE device 108 has been decoupled from the EE 124. The control flow returns to step 1304.

Figure 14:
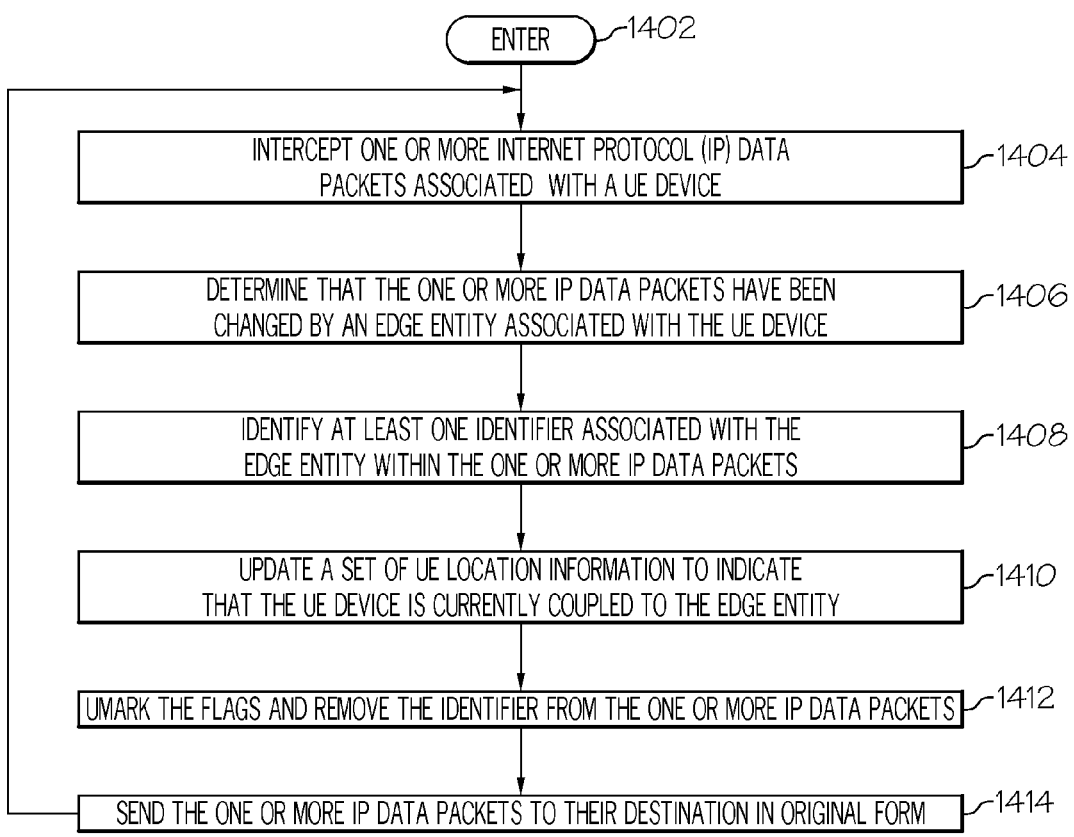
FIG. 14 is an operational flow diagram illustrating one example of detecting mobility of UE devices by a central entity in a wireless communication network according to one embodiment of the present invention.

FIG. 14 is an operational flow diagram illustrating one example of detecting mobility of UE devices by a CE. The operational flow diagram of FIG. 14 begins at step 1402 and flows directly to step 1404. The global UE location manager 122, at step 1404, intercepts one or more Internet Protocol (IP) data packets associated with a UE device 108, where the UE device 108 is coupled to an EE 124. The global UE location manager 122, at step 1406, determines that the one or more IP data packets have been changed by the EE 124. The global UE location manager 122, at step 1408, identifies, based on the determining, at least one identifier associated with the EE 124 within the one or more IP data packets.

The updating global UE location manager 122, at step 1410, updates, based on the at least one identifier, a set of global UE location information 314 to indicate that the wireless communication device is currently coupled to the EE 124. The global UE location manager 122, at step 1412, unmarks the flags in the one or more IP data packets that were changed by the EE 124. The global UE location manager 122 also removes the EE identifier from the one or more IP data packets as well. The global UE location manager 122, at step 1414, sends the one or more IP data packets in their original form to their destination. The control flow returns to step 1404.

Figure 15:
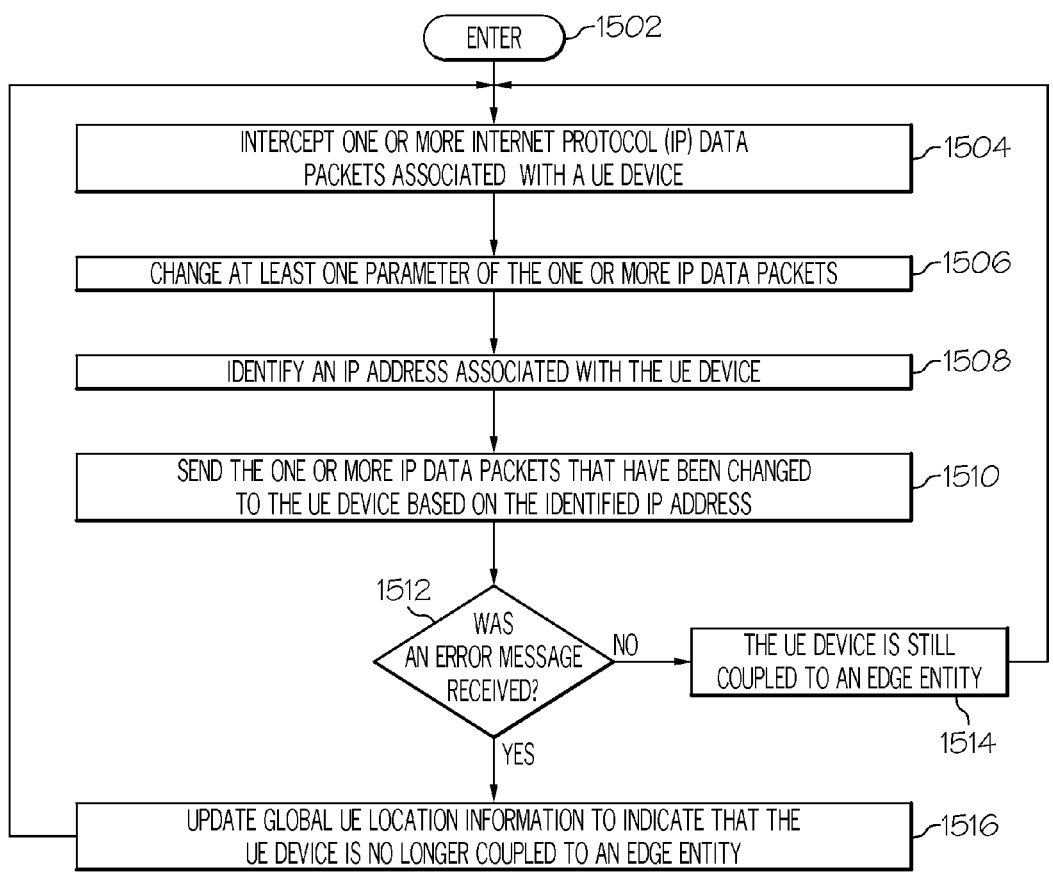
FIG. 15 is an operational flow diagram illustrating another example of detecting mobility of UE devices by an central entity in a wireless communication network according to one embodiment of the present invention.

FIG. 15 is an operational flow diagram illustrating another example of detecting mobility of UE devices by a CE. The operational flow diagram of FIG. 15 begins at step 1502 and flows directly to step 1504. The global UE location manager 122, at step 1504, intercepts one or more Internet Protocol (IP) data packets associated with a UE device 108. The global UE location manager 122, at step 1506, changes (mangles) at least one parameter of the one or more IP data packets. The global UE location manager 122, at step 1508, identifies, based on the data packet and/or the global UE location information 314, the IP address associated with UE device 108.

The global UE location manager 122, at step 1510, sends the one or more IP data packets that have been changed to the UE device 108 based on the identified IP address associated therewith. The global UE location manager 122, at step 1512, determines if an error message was received from the UE device 108. If the result of this determination is negative, the global UE location manager 122, at step 1514, determines that the UE device 108 is still coupled to an EE. If the result of this determination is positive, the global UE location manager 122 determines that the UE device 108 is no longer coupled to an EE. The global UE location manager 122, at step 1516, updates its global UE location information 314 to indicate that the UE device 108 is no longer coupled to an EE. The control flow returns to step 1504.

Information Processing System

Figure 16:
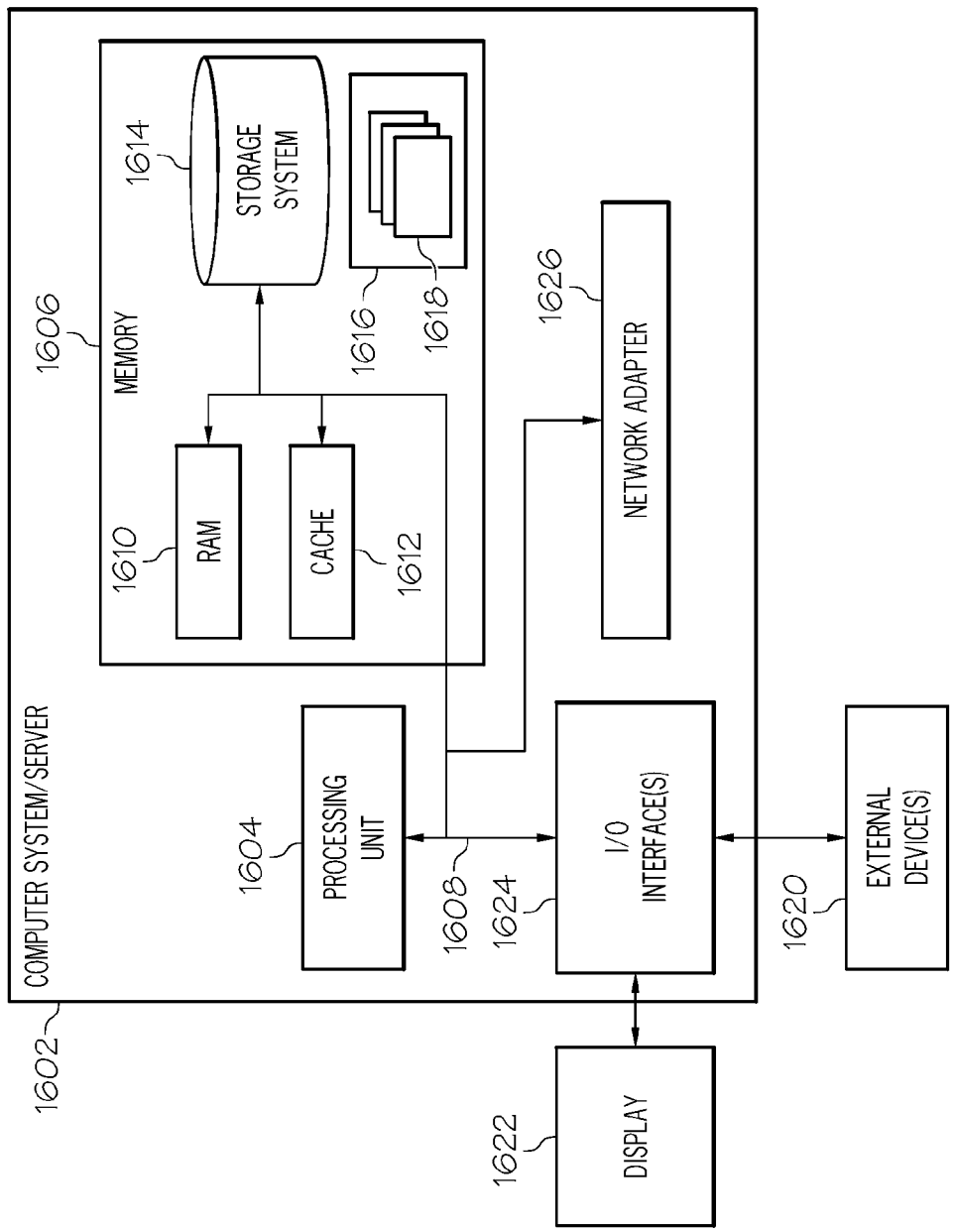
FIG. 16 is a block diagram illustrating one example of an information processing system according to one embodiment of the present invention.

Referring now to FIG. 16, this figure is a block diagram illustrating an information processing system that can be utilized in embodiments of the present invention. The information processing system 1602 is based upon a suitably configured processing system configured to implement one or more embodiments of the present invention (e.g., the EE 124 or CE 118 of FIG. 1). Any suitably configured processing system can be used as the information processing system 1602 in embodiments of the present invention. The components of the information processing system 1602 can include, but are not limited to, one or more processors or processing units 1604, a system memory 1606, and a bus 1608 that couples various system components including the system memory 1606 to the processor 1604.

The bus 1608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 16, the main memory 1606 includes the local or global UE location managers 120, 122 and the local or global UE location information 214, 314. The local or global UE location managers 120, 122 can reside within the processor 1604, or be a separate hardware component. The system memory 1606 can also include computer system readable media in the form of volatile memory, such as random access memory (RAM) 1610 and/or cache memory 1612. The information processing system 1602 can further include other removable/non-removable, volatile/non-volatile computer system storage media. By way of example only, a storage system 1614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1608 by one or more data media interfaces. The memory 1606 can include at least one program product having a set of program modules that are configured to carry out the functions of an embodiment of the present invention.

Program/utility 1616, having a set of program modules 1618, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. Program modules 1618 generally carry out the functions and/or methodologies of embodiments of the present invention.

The information processing system 1602 can also communicate with one or more external devices 1620 such as a keyboard, a pointing device, a display 1622, etc.; one or more devices that enable a user to interact with the information processing system 1602; and/or any devices (e.g., network card, modem, etc.) that enable computer system/server 1602 to communicate with one or more other computing devices. Such communication can occur via I/O interfaces 1624. Still yet, the information processing system 1602 can communicate with one or more networks such as a local area network (LAN), a general wide area network (WAN), and/or a public network (e.g., the Internet) via network adapter 1626. As depicted, the network adapter 1626 communicates with the other components of information processing system 1602 via the bus 1608. Other hardware and/or software components can also be used in conjunction with the information processing system 1602. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An edge entity disposed at an edge of a wireless communication network for detecting mobility of wireless communication devices, the edge entity comprising:
   a memory;
   a processor communicatively coupled to the memory; and
   a local device location manager communicatively coupled to the memory and the processor, wherein the local device location manager is configured to perform a method comprising:
   analyzing one or more Internet Protocol (IP) data packets associated with a wireless communication device, wherein the one or more IP data packets being transmitted from the wireless communication device through a core Internet Protocol network to at least one information processing system comprising data requested by the wireless communication device, wherein the wireless communication device is coupled with the edge entity, and where the core Internet Protocol network comprises a public network and couples the at least one information processing system to the wireless communication network, wherein the analyzing comprises identifying at least one of a source address, a destination address, and a unique identifier associated with the wireless communication device;
   determining, based on the analyzing and data within the one or more IP data packets, that the wireless communication device is a newly coupled device at the edge entity, wherein the determining comprises:
   comparing the at least one of the source address, the destination address, and the unique identifier to a set of wireless communication device location information; and
   determining, based on the comparing, that a match fails to exist within the set of wireless communication device location information, wherein the match failing to exist indicates that the wireless communication device is a newly coupled device at the edge entity; and
   notifying, based on the determining, a central entity disposed within the wireless communication network that the wireless communication device is currently coupled to the edge entity.

2. The edge entity of claim 1, wherein the notifying comprises:
   sending a message to the central entity comprising at least an identifier associated with the wireless communication device and an identifier associated with the edge entity.

3. The edge entity of claim 1, wherein the central entity is an information processing system that monitors data traffic in the wireless communication network.

4. The edge entity of claim 1, wherein the notifying comprises:
   changing at least one IP data packet being sent from the wireless communication device by
   marking at least one unused flag in a header of the IP data packet, and
   including at least one identifier associated with the edge entity within the IP packet; and sending, after the changing, the at least one IP data packet to the central entity.

5. A non-transitory computer program storage product for detecting mobility of wireless communication devices with an edge entity disposed at an edge of a wireless communication network, the computer program storage product comprising instructions configured to perform a method comprising:

analyzing one or more Internet Protocol (IP) data packets associated with a wireless communication device, wherein the one or more IP data packets being transmitted from the wireless communication device through a core Internet Protocol network to at least one information processing system comprising data requested by the wireless communication device, wherein the wireless communication device is coupled with the edge entity, and where the core Internet Protocol network comprises a public network and couples the at least one information processing system to the wireless communication network, wherein the analyzing comprises identifying at least one of a source address, a destination address, and a unique identifier associated with the wireless communication device;

determining, based on the analyzing and data within the one or more IP data packets, that the wireless communication device is a newly coupled device at the edge entity, wherein the determining comprises:

comparing the at least one of the source address, the destination address, and the unique identifier to a set of wireless communication device location information; and determining, based on the comparing, that a match fails to exist within the set of wireless communication device location information, wherein the match failing to exist indicates that the wireless communication device is a newly coupled device at the edge entity; and notifying, based on the determining, a central entity disposed within the wireless communication network that the wireless communication device is currently coupled to the edge entity.

6. The non-transitory computer program storage product of claim 5, wherein the notifying comprises:

sending a message to the central entity comprising at least an identifier associated with the wireless communication device and an identifier associated with the edge entity.

7. The non-transitory computer program storage product of claim 5, wherein the central entity is an information processing system that monitors data traffic in the wireless communication network.

8. The non-transitory computer program storage product of claim 5, wherein the notifying comprises:

changing at least one IP packet being sent from the wireless communication device by marking at least one unused flag in a header of the IP packet, and including at least one identifier associated with the edge entity within the IP packet; and sending, after the changing, the at least one IP to the central entity.

\* \* \* \* \*